No. 872,116. PATENTED NOV. 26, 1907.
C. H. FERGUSON.
FLUID PRESSURE BRAKE APPARATUS.
APPLICATION FILED FEB. 12, 1907.
2 SHEETS—SHEET 1.
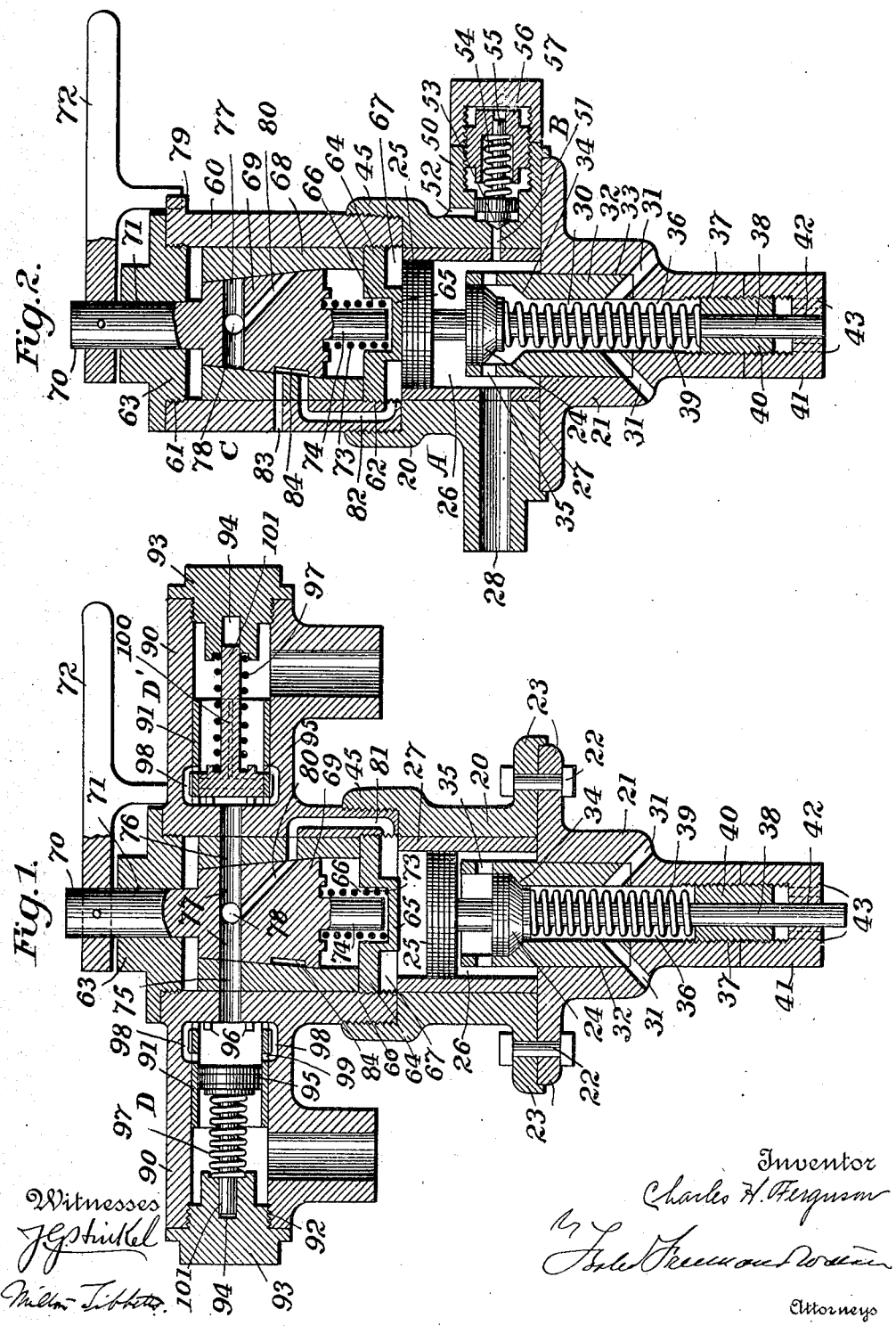

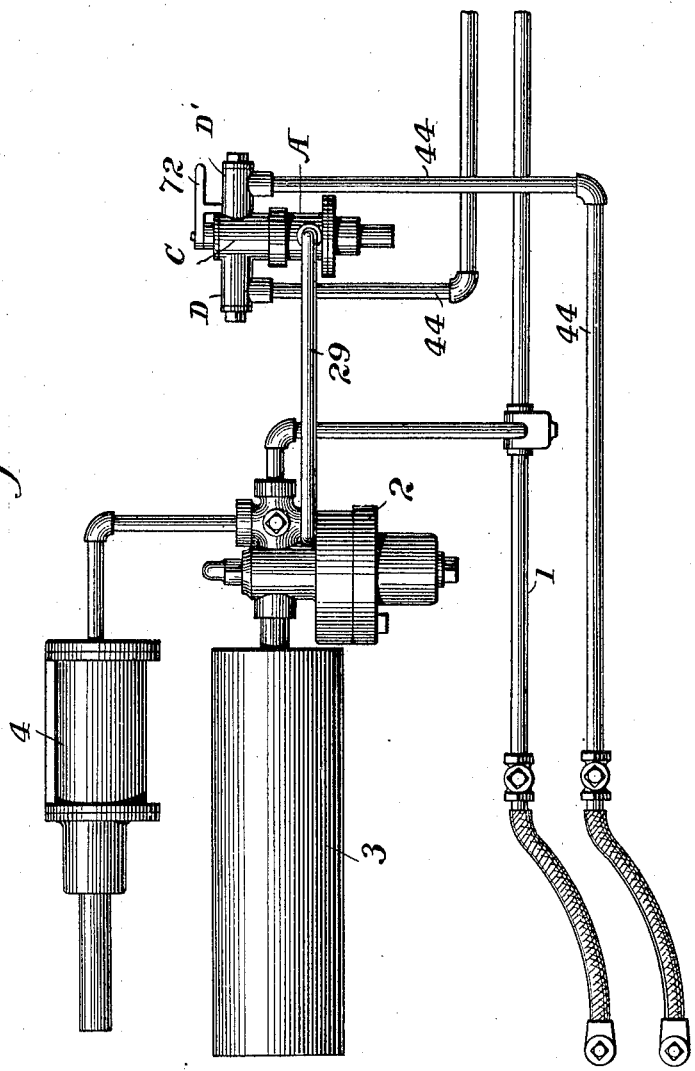

UNITED STATES PATENT OFFICE.

CHARLES H. FERGUSON, OF JERSEY CITY, NEW JERSEY.

FLUID-PRESSURE BRAKE APPARATUS.

No. 872,116.            Specification of Letters Patent.            Patented Nov. 26, 1907.

Application filed February 12, 1907. Serial No. 357,037.

*To all whom it may concern:*

Be it known that I, CHARLES H. FERGUSON, a citizen of the United States, residing at Jersey City, in the county of Hudson and State of New Jersey, have invented certain new and useful Improvements in Fluid-Pressure Brake Apparatus, of which the following is a specification.

This invention relates to fluid pressure brake apparatus, and particularly to retainer valves and their associated elements, and has for an object the production of a retainer valve of simple and inexpensive construction which may be operated by fluid pressure supplied from the main reservoir through a secondary supply pipe under the control of the engineer; which may be cut out of service without interfering with the operativeness of the remainder of the retainer valves of a system; and which will remain operative for considerable time if a break should occur in the secondary supply pipe.

Other objects will appear from the following description taken in connection with the accompanying drawings forming a part of this specification, and in which,—

Figure 1 is a vertical sectional view of a device embodying one form of the invention; Fig. 2 is a similar view taken at right angles to Fig. 1 but showing certain of the parts in different relative positions; Fig. 3 is a diagrammatic view showing the relative arrangement of the elements embodied in a brake system to which the invention is applicable.

Referring to Fig. 3, the main train pipe 1, the triple valve 2, the auxiliary reservoir 3, and the brake cylinder 4, comprise the salient features of a well known automatic fluid pressure brake system, in which reduction of pressure in the main train pipe operates to set the brakes by the action of the triple valve opening communication between the auxiliary reservoir and the brake cylinder and cutting it between the auxiliary reservoir and the train pipe, and restoration of the pressure in the main train pipe releases the brakes by actuating the triple valve to reëstablish communication between the train pipe and the auxiliary reservoir, cutting it between the reservoir and the brake cylinder, and permitting the brake cylinder to exhaust through the triple. In order to retain the pressure in the brake cylinder therefore, while recharging the auxiliary reservoir, it is necessary to close the exhaust from the triple. This is what is accomplished by the retainer valve herein shown.

A represents somewhat generally the retainer valve proper, B the equalizer valve, C the cut-out valve, and D, D' the identical equalizer check valves, which comprise the main elements of the invention.

The retainer valve proper comprises the two-part casing 20 and 21, removably secured together by bolts 22, passing through flanges 23 on the casing, the plug member 24, and the means 25 for operating the latter located within the casing. The interior of the casing may be of any convenient shape, but is shown as forming a cylindrical chamber 26 provided with a lining 27. This chamber communicates with the exhaust of the triple valve through the passage 28 and connecting pipe 29, and with the atmosphere through the central passage 30 and its inclined branches 31. The central passage 30 may be formed directly in the body of the casing, or, as shown in the drawings, a seat piece 32 may be set in a cavity 33 in the lower part of the casing and have the central passage formed therein. This seat piece is also preferably provided with a conical seat 34 and openings 35 for purposes hereinafter described.

The lower part 21 of the casing is centrally bored as at 36 and internally screw threaded as at 37 to receive the guide rod 38, spring 39, and adjusting nut 40. A cap 41, having a central opening 42 for the passage therethrough of the guide rod 38, and leakage ports 43, screws onto the adjusting nut 40 and locks the latter in adjusted position.

Adapted to be seated on the conical seat 34 is the plug member 24, connected to the guide rod 38 and adapted when seated to effectually close the central passage 30 and thereby retain any fluid which may enter the chamber 26 from the triple exhaust, as above suggested. The plug member, however, is normally held by the pressure of the spring 39 away from its seat, as shown in Fig. 2 of the drawings, thus permitting the triple valve to exhaust to the atmosphere through passage 28, chamber 26, openings 35, central passage 30 and inclined branches 31.

By the present invention means are provided for closing this plug member at will against the pressure of the spring 39 by fluid pressure supplied through a secondary train pipe 44 under the control of the engineer. Any suitable piston arrangement may be devised to utilize this pressure supply, but preferably a piston 25 is mounted on the plug member 24 and moves with it in the cylindrical chamber 26. In this construction, it will be seen therefore that if fluid under sufficient pressure be supplied to the chamber 26 above the piston 25, the latter will be forced downward together with the plug member 24, which will be seated on the seat member 34, closing communication with the atmosphere.

It will here be noted that the exhaust fluid entering the chamber 26 below the piston 25 will tend to raise the latter thus aiding the spring 39 to secure a positive action of the valve.

Referring to some of the details of construction of the retainer valve A, it will be noted that in the normal position of the plug member 24, as shown in Fig. 2, the lower end of the guide rod 38 is approximately flush with the outer surface of the cap 41, but when the plug member is seated and the valve consequently closed, the said end projects noticeably below the cap and acts as a visible signal that the valve has properly operated. The inclination of the branch passages 31 aids in keeping the central passage 30 clear of dirt and other foreign matter liable to collect therein, and the leakage ports 43 in the cap 41 serve to permit the escape of fluid or sediment which has passed through the bore 36 between the nut 40 and the loosely fitting rod 38. Thus the passage from the chamber 26 to the atmosphere is kept clear, and the parts are easily assembled and disassembled.

For the purpose of maintaining a uniform maximum braking pressure on all of the cars of a train, there is provided in connection with each of the retainer valves what may be conveniently termed an equalizer valve, and though any approved style of equalizer valve may be used with the retainer valve above described, a preferred form is shown at B in Fig. 2 of the drawing, and comprises a valve casing 50 whose interior communicates with the chamber 26 of the retainer valve through a passage 51 and with the atmosphere through one or a series of ports 52. The passage 51 is normally closed by a piston plug 53 urged to its seat by a spring 54 guided by rod 55 connected to said plug and sliding in the adjusting nut 50, which latter is screw threaded into the interior of the valve casing, as shown. The tension of the spring 54 may thus be varied by manipulating the nut 56, to secure a uniformity of maximum braking pressure on all cars of a train. A cap 57 closes the outer end of the casing 50, and acts as a lock nut in the same manner as cap 41 of the retainer valve.

As above intimated, fluid under pressure is supplied to the chamber 26 above the piston 25 for the purpose of operating the latter and the supply of said fluid is intended to be taken from the main pressure reservoir on the engine or any other suitable source and conveyed to said chamber through the secondary train pipe 44 via a suitable three-way cock, not shown, under the control of the engineer.

If the pressure retainer mechanism of a single car of a train should become inoperative, or if, for any other reason, it should be desirable to discontinue the service of said retainer mechanism without impairing the operativeness of the remainder of the pressure retainers on the train, a hand operated cut-out valve C is provided, which may be of any suitable form so that it effects the cutting off of the supply of fluid to the retainer valve to which it is connected, opens the chamber 26 above the piston of the said retainer valve, and permits the uninterrupted flow of the pressure fluid around said disabled retainer mechanism. The valve C herein shown answers these requirements, but any other form of valve answering the same purpose is included within the scope of the invention.

For convenience and compactness of arrangement, the casing 60 of the cut-out valve C is mounted on top of the casing of the retainer valve A, being in this instance screwed into an upwardly extending flange 45 on said casing. Said casing 60 is preferably cylindrical in form, and both ends thereof are internally screw threaded as at 61 and 62 respectively, the upper end to receive a closure 63 and the lower end to receive an abutment plug 64. This abutment plug 64 is provided with a central boss 65 on its lower side and with a central cavity 66 on its upper side and, in this instance, it forms the upper wall of chamber 26 and the lower closure of the casing 60. As will be seen by reference to Fig. 2, the boss 65 forms an abutment for the piston 25 in its upward movement and thus provides an annular space 67 within the casings when said piston is in its uppermost position, whereby a working surface is presented to the fluid entering said annular space.

A lining 68 of suitable material is placed within the casing 60 and internally is in the form of a frustum of a cone, and seated therein is the conical rotary valve 69 having an extension 70 projecting through opening 71 in the closure 63, said extension having keyed to it an operating handle 72 on the outside of the casing. The rotary valve 69 is in this instance maintained in its seat by the spring 73 placed between its under side and the abutment plug 64 and guided by an extension 74 on the plug. Said extension and spring are preferably positioned in the central cavity 66 in the abutment plug.

The casing 60 and its lining are provided with ports 75 and 76, shown in Fig. 1, communicating with the auxiliary train pipe 44, and the rotary valve 69 is grooved or bored so that in either of its two positions, which are preferably at right angles to each other, an uninterrupted passage through or around said plug is provided between said ports 75 and 76. In the drawings this passage is shown as comprising two bores 77 and 78 made at right angles to each other in the same plane and of course meeting at the center of the plug; thus in the position of the parts shown in Fig. 1, the fluid would pass through port 75, bore 77 and port 76, while in the position of the parts shown in Fig. 2, the fluid would pass from port to port through bore 78. It will be understood that the outside of the casing 60 is provided with suitable stops, as 79, to limit the movement of the handle 72 and consequently the rotary valve 69. The rotary valve 69 is also provided with a passage 80 leading from the passage 77, 78, to the casing lining, and communicating with this passage 80 when the rotary valve is in its normal working position, as shown in Fig. 1, is a by-pass 81 formed in the casing and opening into the annular space 67, or, what is equivalent thereto, the chamber 26 of the retainer valve. Thus is established direct communication between the secondary train pipe and the chamber 26, whereby the piston may be operated by fluid pressure at the will of the engineer. Formed also in the casing 60 is an exhaust by-pass 82 from the chamber 26, and a port 83, which by-pass and port are closed by the rotary valve 69 in its normal working position, but are connected by the groove 84 formed in the rotary valve when the latter is in its abnormal or cut-off position; whereby any fluid in the chamber 26 above the piston 25 will be permitted to escape to the atmosphere, as shown plainly in Fig. 2. In this latter position, it will be noted that although the particular retainer valve will be cut off from communication with the secondary train pipe, yet the fluid in the latter will still have an uninterrupted passage through the cut-out valve to the other braking apparatuses of the train.

It will be readily understood from the foregoing that the retainer valve is operated by what is termed the "straight air" system, and should the secondary train pipe be connected directly with the main reservoir of the engine, it is obvious that in the event of a break in said train pipe, the air would be allowed to escape from the main reservoir unless checked by the engineer. This contingency is provided for in this invention by what may be termed equalizer check valves, represented in the drawings in Fig. 1 at D and D'. One of these valves preferably is placed between each of the ports 75 and 76 and their respective connections with the secondary pipe, and for convenience are shown as mounted directly on the casing of the cut-out valve C. As these valves are exactly similar in construction, only one of them will be described.

The casing 90 is lined as at 91 and screw threaded at its outer end at 92 to receive the cap nut 93 having the cavity 94 formed therein. Slidably mounted within the casing is a piston valve 95 permanently held away from the port 75 (or 76) by stops 96 against which it is yieldably retained by spring 97. One or a series of by-passes 98 are formed in the casing 90 around said piston valve, whereby in its normal position, shown at the right in Fig. 1, said piston valve will in no way interfere with the flow in the secondary train pipe, the spring 97 being of sufficient strength to hold the piston against the stops 96 under ordinary conditions of use; but in the event of a break in said pipe, or other condition causing a sudden reduction of pressure on the outer side of said piston valve, the latter will be caused by the sudden back pressure to move against the stress of the spring 97 and cover the outer opening 99 of the by-pass 98, thus preventing the escape of fluid through the port 75 (or 76). This latter position of the piston valve 95 is shown at the left in Fig. 1.

A leakage groove 100 is formed in the casing to permit the fluid to escape gradually as a signal to aid in locating the break. A guide rod 101 is connected to the piston valve and moves in the cavity 94, abutting against the bottom thereof to limit the movement of the piston for preventing undue stress on the spring.

The operation of the device will be obvious from the above detailed description.

The invention is not limited to the details of construction shown, as obviously many modifications may be made thereof without departing from the spirit, or taking it without the scope of the invention.

What I claim is:—

1. The combination with the exhaust port of a fluid pressure brake apparatus, of a retainer valve connected thereto and having a normally open plug member, a piston connected to said plug member, means to admit the exhaust from said port to one side of said piston, and means to admit fluid under pressure to the other side of said piston.

2. The combination with a retainer valve having a piston operated plug member, of a source of fluid supply, and means on said valve to connect and disconnect said source to an operative position with said piston.

3. The combination with an automatic air brake system of the class described, of a retainer valve for each brake cylinder of said system for controlling the exhaust therefrom, a secondary fluid pressure supply pipe operatively connected with said retainer valves, and means for cutting out any one of said retainer valves without affecting the operativeness of the remainder of those in the system.

4. The combination with an automatic air brake system of the class described, of a retainer valve for each brake cylinder of said system, controlling the exhaust therefrom, a secondary fluid pressure supply pipe operatively connected with said retainer valves, and means for cutting out any one of said retainer valves and permitting the fluid to exhaust therefrom without affecting the operativeness of the remainder of those of the system.

5. In a pressure supply system, a valve comprising a casing having a by-pass and a piston therein held yieldably between the openings of said by-pass and adapted to remain in such position during normal working variations of pressure and to render said by-pass inoperative upon sudden reduction of pressure at one side of said piston.

6. In a pressure supply system, a valve comprising a casing having a by-pass and a leakage groove and a piston therein held yieldably between the openings of said by-pass and adapted to remain in such position during normal working variations of pressure and to render said by-pass inoperative upon sudden reduction of pressure at one side of said piston.

7. In a system of the class described, the combination with a series of valves operated by fluid pressure supplied by a single line of pipe, of a valve at either side of each of said first mentioned valves adapted to act to retain the pressure in said first mentioned valves upon a sudden reduction of pressure between any two of said first mentioned valves.

8. In a valve of the class described, a casing having a chamber and a central passage leading therefrom, inclined ports leading from said passage to the atmosphere, and leakage ports leading from the bottom of said passage to the atmosphere.

9. In a valve of the class described, a plug member therein and a rod connected to said plug member projecting noticeably through the casing of the valve when the member is seated and being entirely withdrawn into the casing when the plug member is in open position.

10. In a pressure supply system, a valve comprising a casing having a by-pass, a piston therein and a spring adapted to hold said piston yieldably between the openings of said by-pass.

11. In a pressure supply system, a valve comprising a casing having a by-pass, a piston therein, and a spring adapted to hold said piston yieldably between the openings of said by-pass, and permit said piston to render said by-pass inoperative upon a sudden reduction of pressure at one side of said piston.

12. In a pressure supply system, a valve comprising a casing having a by-pass, a piston adapted to reciprocate in said casing, a stop to prevent said piston covering one of the openings of said by-pass, and a spring adapted to yieldably hold the piston against said stop and between the openings of said by-pass, whereby upon a sudden reduction of pressure upon the spring side of said piston the latter will be moved to render the by-pass inoperative.

13. In an automatic air brake system of the class described, the combination with a retainer valve controlling the exhaust from the brake cylinder and a secondary fluid pressure supply pipe operatively connected with said retainer valve, of a valve in said secondary pipe adapted to cut out said retainer valve while permitting the pressure fluid to pass uninterruptedly around said retainer valve to the other retainer valves of the system.

14. In an automatic air brake system of the class described, the combination with a retainer valve controlling the exhaust from the brake cylinder and a secondary fluid pressure supply pipe, of a valve in said secondary pipe adapted in one position to supply pressure fluid to said retainer valve and in another position to cut off said supply and open the exhaust of said retainer valve.

15. In an automatic air brake system of the class described, the combination with a retainer valve controlling the exhaust from the brake cylinder and a secondary fluid pressure supply pipe, of a valve in said secondary pipe adapted in one position to supply pressure fluid to said retainer valve and in another position to cut off said supply and open the exhaust of said retainer valve, either position of said valve permitting the pressure fluid to flow uninterruptedly therethrough.

16. In a system of the class described, a triple valve, a retainer valve connected with the exhaust therefrom and operated by fluid pressure supplied through an auxiliary train pipe, and a valve in said train pipe at either side of said retainer valve adapted to act to retain the pressure in said retainer valve upon a sudden reduction of pressure in said train pipe.

17. In a pressure supply system, a valve having a by-pass and means adapted to permit the free passage of fluid through such by-pass during normal working variations of pressure and to render said by-pass inoperative upon a sudden reduction of pressure at one side of said valve.

18. In a pressure supply system, a valve comprising a casing having a by-pass, a piston therein and means adapted to hold said piston yieldably between the openings of said by-pass and permit the free passage of fluid through such by-pass during normal working variations of pressure and allow said piston to move to render said by-pass inoperative upon a sudden reduction of pressure at one side of said piston.

In testimony whereof I affix my signature in presence of two witnesses.

CHARLES H. FERGUSON.

Witnesses:
ARTHUR L. BRYANT,
ANNA FERGUSON.